3,187,362
SWITCH-BANK CLEANING TOOL
Jim C. Garrett, Inglewood, Calif.
(8060 Salt Lake Ave., Huntington Park, Calif.)
Filed Feb. 10, 1964, Ser. No. 343,720
7 Claims. (Cl. 15—210)

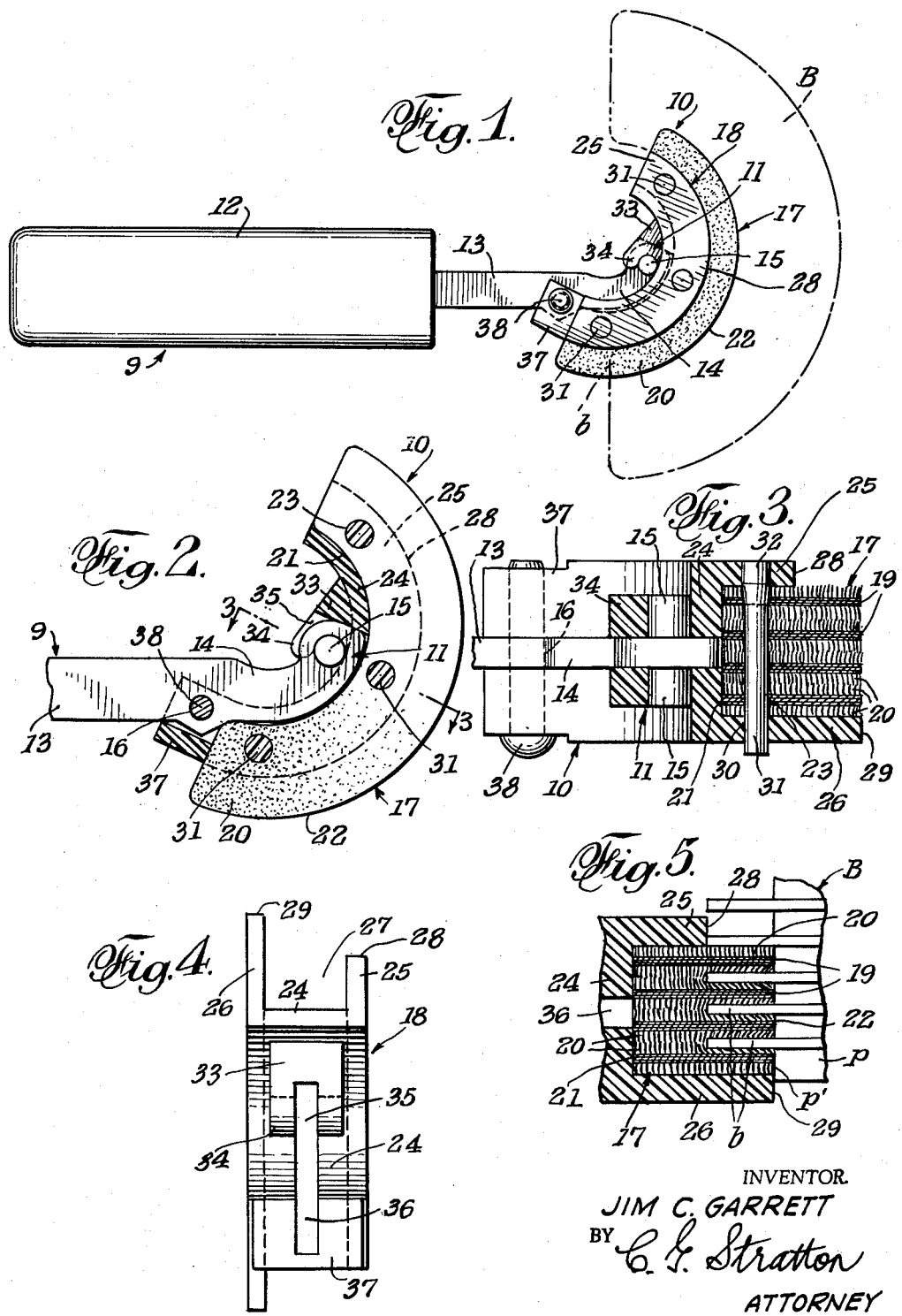

This invention relates to a tool for cleaning switch banks, particularly those that are of arcuate form.

An object of the present invention is to provide a tool for the indicated purpose that comprises a pre-packed discardable cleaning unit and a reusable handle to facilitate cleaning of switch banks of similar form but varying in the number of banks and the arrangement thereof.

Another object of the invention is to provide a tool of the character referred to in which the pre-packed unit and the handle are readily operatively engaged and as easily separated, enabling quick interchange of units on the same handle and, therefore, greatly facilitating cleaning of switch banks irrespective of the arrangement and number thereof.

A further object of the invention is to provide a switch-bank cleaning tool embodying novel and simplified connection means between the handle and the cleaning unit thereof.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

FIG. 1 is a bottom elevational view of a switch-bank cleaning tool according to the present invention.

FIG. 2 is an enlarged longitudinal sectional view thereof, the handle being broken away.

FIG. 3 is a further enlarged cross-sectional view as taken on the line 3—3 of FIG. 2.

FIG. 4, to the scale of FIG. 2, is an end view of a carrier element of the pre-packed cleaning unit of the tool.

FIG. 5 is a fragmentary cross-sectional view showing the manner of use of the present tool to clean portions of a switch bank.

Switch banks B have an arcuate form, as in FIG. 1, the present tool being devised to clean parts *b* located at the inner circumferential portion of the banks and suggested in FIG. 5. The number of such parts *b* may vary in different switch banks and, also, the banks, at both the tops and bottoms thereof, are provided with plates *p* that have edges *p'* that are convexly curved in a manner to allow protrusion of the parts *b* to be cleaned.

The present tool, as above contemplated, comprises a handle 9, a pre-packed cleaning unit 10, means 11 separably interconnecting the handle and unit to provide for facile connection and separation thereof.

The handle 9 is shown as having a grip 12, and an extension 13 therefrom. The latter is formed with an arcuate end portion 14 that is provided with aligned oppositely directed trunnions 15. Intermediate its length, the handle extension 13 is provided with a hole 16. The handle extension is preferably formed of a piece of flat metal stock.

The pre-packed cleaning unit 10 is shown as comprising a stack of cleaning members 17, and a carrier 18 for said member and preferably molded of nylon plastic or similar synthetic material of good resistance to impact.

The cleaning members 17 (four being shown in the present stack) comprise flat, arcuate sheets each having a base sheet 19 with a nap or pile layer 20 on each side thereof, the stack, therefore, being compressible so that members, such as parts *b* may be introduced between adjacent cleaning members, as illustrated in FIG. 5, whereby movement of the stack of cleaning members 17 will cause them to wipe over the opposite sides of said parts *b* to clean them. Each member is of semi-circular form, having an inner concave edge 21 and an outer concentric convex edge 22. Also, three uniformly spaced holes 23 are provided in each of said members, the same being in register when the members are stacked.

The carrier 18 is formed to have a generally U-shaped cross-sectional form with an arcuate base wall 24, and side flanges 25 and 26 to define a channel 27 in which the stack of cleaning members 17 fits. The carrier 18, depending on whether the unit 10 is to be used for cleaning intermediate parts *b* of a bank of switches B, or upper parts *b* adjacent to an upper plate *p* of a bank, or lower parts *b* adjacent to a lower plate *p* of a bank, will have shallow side flanges on both sides so that both sides of the stack 17 extend beyond the outer edges 28 of the shallow flanges, or will have one shallow flange 25 and one deep flange 26 that has an outer edge 29. FIG. 5 shows one of the latter forms of carrier and that the flange edge 28 clears the members *b* being cleaned and the flange edge 29 has contact with the outer edge *p'* of plate *p* so the unit 10 may be moved in an oscillatory manner with edge *p'* as a guide to cause the stack of cleaning members 17 to clean the switch-bank parts *b*, as hereinbefore indicated.

The flanges 25 and 26 are provided with holes 30 that are in register with the holes 23 in the cleaning members 17, and a set of pins 31, also of nylon plastic, are press-fitted or driven into said registered holes to firmly secure the stack of cleaning members in the channel 27 of the carrier. By providing each of said pins 31 with a taper-enlarged end 32, said pins may be force-fitted to obtain a securely locked assembly of stack 17 and carrier 18.

The above-described pre-packaged cleaning unit may be used to clean switch banks until the elements 17 become ineffective to clean properly, in which case, the same is removed from the handle 9 and discarded and replaced by another unit so cleaning of the switch banks may proceed. The means 11 affords simple means for effecting a rapid exchange of units 10.

Said means 11 includes the trunnions 15 on the handle extension 13 and further comprises a lug 33 integrally molded on the inner concave surface of base wall 24 of the carrier, a hook 34 being formed in said lug to receive the trunnions 15. To enable this engagement of the trunnions with the hook 34, the lug 33 is bifurcated to receive the end 14 of the handle extension 13, said bifurcation 35 forming the end of a slot 36 in wall 24, and in which the handle extension portion 14 fits. A molded extension 37 on the end of the carrier from which the handle 9 extends, receives a locking pin 38 which extends through the mentioned hole 16 in the handle extension 13.

The pin 38 cooperates with the trunnions 15 to lock the handle and carrier firmly together and it is a simple matter to pull the pin 38 so the handle may be swung out of slot 36 on the axis of the trunnions 15, thus freeing the handle to be moved in a manner to withdraw said trunnions from the hook 34, thus separating the unit 10 from the handle. Connection with the handle of another or replacement unit 10 is as easily effected.

It will be noted, particularly from FIG. 1, that the construction is such as to have the handle grip 12 extend from the unit 10 at such an angle that said grip is at an angle to the mid line of the unit. Thus, when the unit 10 is in a symmetrically engaged position with the switch bank B, the handle extends at an angle to said bank and oscillatory cleaning movement of the tool is more conveniently effected. It will also be noted that the unit, when in cleaning engagement with the switch bank, will clean any member that is located on the center on which the curvature of said bank is generated.

While the foregoing has illustrated and described what is now contemplated to be the best mode of carrying out the invention, the construction is, of course, subject to modification without departing from the spirit and scope of the invention. Therefore, it is not desired to restrict the invention to particular form of construction illustrated and described, but to cover all modifications that may fall within the scope of the appended claims.

Having thus described this invention, what is claimed and desired to be secured by Letters Patent is:

1. A unit for cleaning arcuate switch banks comprising:
    (a) an arcuate carrier having a channel cross-section defined by a curved base wall and two flange walls,
    (b) an arcuate stack of switch-part cleaning members having an inner concave edge and an outer convex edge disposed in said channel with said concave edge engaged with said base wall,
    (c) at least one of the carrier flanges having the outer convex wall thereof inwardly spaced from the outer convex edge of said stack of cleaning members, and
    (d) means extending through the stack and through the flanges of the carrier to affix the former to the latter.

2. A cleaning unit according to claim 1 provided on the concave face of the base wall of the carrier with handle engaging means.

3. A cleaning unit according to claim 2 in which the last-mentioned means is integrally molded on the carrier and includes a hook for separable engagement with a handle, and a locking pin extending through the carrier and handle remote from the hook to lock the handle and carrier together when the hook and handle are engaged.

4. A cleaning unit according to claim 1 in which the carrier and the affixing means are formed of nylon plastic, and the stack of cleaning members comprises flexible sheets with pile layers on both sides thereof.

5. A tool for cleaning arcuate switch banks having a concave edge with cleaning parts extending inward of said edge, said tool comprising:
    (a) an arcuate unit comprising a carrier of rigid plastic material, and a stack of switch-part cleaning members fixedly held in said carrier,
    (b) said carrier and cleaning means having outer concentric convex edges, the former to engage a concave edge when the stack of cleaning members are in cleaning engagement with the switch parts, and
    (c) a handle separably connected to said unit to impart oscillatory movement of the unit, as guided by the concave edge of the stack, to clean the switch parts.

6. A tool according to claim 5 in which the mentioned stack members comprise flexible sheets with pile layers on both faces thereof to clean switch parts introduced between adjacent layers.

7. A discardable switch-bank cleaning unit comprising:
    (a) an arcuate molded nylon plastic carrier of channel cross-sectional form,
    (b) a stack of arcuate cleaning sheets disposed in the channel carrier with portions of said stack exposed beyond the carrier,
    (c) pins to permanently affix the stack to the carrier, and
    (d) a hook formed as a molded part of the carrier and adapted for separable connection to a handle by means of which the carrier is movable in an oscillatory manner to cause the sheets of the stack to clean switch-bank parts introduced between them.

References Cited by the Examiner
UNITED STATES PATENTS

| | | | |
|---|---|---|---|
| 730,012 | 6/03 | Gilbert | 15—224 |
| 2,503,558 | 4/50 | Mesch | 15—97 |
| 2,504,709 | 4/50 | Lorimer | 15—97 |
| 2,843,869 | 7/58 | Hermance | 15—181 X |

CHARLES A. WILLMUTH, *Primary Examiner.*